(12) United States Patent
Robinson

(10) Patent No.: US 8,231,345 B2
(45) Date of Patent: Jul. 31, 2012

(54) FAN BLADE PITCH CHANGE ASSEMBLY

(75) Inventor: James S. Robinson, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1009 days.

(21) Appl. No.: 12/198,593

(22) Filed: Aug. 26, 2008

(65) Prior Publication Data

US 2009/0060739 A1 Mar. 5, 2009

Related U.S. Application Data

(60) Provisional application No. 60/969,829, filed on Sep. 4, 2007.

(51) Int. Cl.
- *F01D 7/00* (2006.01)
- *B60K 11/06* (2006.01)
- *F04D 27/00* (2006.01)

(52) U.S. Cl. .............. 416/39; 416/38; 416/48; 416/155; 416/162; 416/164

(58) Field of Classification Search ................... 416/38, 416/39, 48, 155, 162, 164
See application file for complete search history.

(56) References Cited

U.S. PATENT DOCUMENTS

| | | | |
|---|---|---|---|
| 2,208,602 A | 7/1940 | Ruths et al. | |
| 2,487,836 A * | 11/1949 | Turnbull | ................ 416/155 |
| 2,679,299 A | 5/1954 | Kelson, Sr. | |
| 2,711,769 A | 6/1955 | Amiot | |
| 3,092,186 A | 6/1963 | MacLean | |
| 3,098,184 A | 7/1963 | Deriaz | |
| 3,138,136 A | 6/1964 | Nichols | |
| 3,967,916 A * | 7/1976 | Chittom | ................ 416/167 |
| 4,332,526 A * | 6/1982 | Culk | ................ 416/166 |
| 4,534,524 A | 8/1985 | Aldrich | |
| 4,671,737 A | 6/1987 | Whitehouse | |
| 4,772,182 A | 9/1988 | Witte | |
| 5,102,301 A | 4/1992 | Morrison | |
| 5,122,034 A | 6/1992 | Isert | |
| 5,205,712 A | 4/1993 | Hamilton | |
| 5,281,094 A | 1/1994 | McCarty et al. | |
| 5,451,141 A | 9/1995 | Carvalho et al. | |
| 6,113,351 A * | 9/2000 | McCallum et al. | ............ 416/48 |
| 6,253,716 B1 | 7/2001 | Palmer et al. | |
| 6,564,899 B1 | 5/2003 | Arian et al. | |
| 6,644,922 B2 | 11/2003 | McCallum et al. | |
| 6,659,894 B2 | 12/2003 | Kern et al. | |
| 6,729,844 B2 | 5/2004 | Bettencourt | |
| 6,896,564 B2 | 5/2005 | Willmot | |

FOREIGN PATENT DOCUMENTS

GB 2168435 6/1986

OTHER PUBLICATIONS

U.S. Appl. No. 12/198,582, filed Aug. 26, 2008.

* cited by examiner

*Primary Examiner* — Jerome Jackson, Jr.
*Assistant Examiner* — David Spalla
(74) *Attorney, Agent, or Firm* — Plumsea Law Group, LLC; Mark E. Duell

(57) ABSTRACT

An assembly for changing the pitch of fan blades rotatably attached to a hub includes a main drive shaft configured to rotate the hub. The main drive shaft is rotated by a first motor. A secondary drive shaft is coupled to the main drive shaft via a gearing system located within the hub. The secondary drive shaft is also driven by a second motor. When driven by the second motor, the secondary drive shaft manipulates the gearing system to alter the pitch of the fan blades.

20 Claims, 4 Drawing Sheets

FAN BLADE PITCH CHANGE ASSEMBLY

CROSS-REFERENCE TO RELATED APPLICATION

This application claims priority under 35 U.S.C. §119(e) to U.S. Provisional Patent Application No. 60/969,829, entitled "Variable Pitch Radiator Fan Control System and Pitch Change Mechanism", and filed on Sep. 4, 2007, which application is hereby incorporated by reference.

BACKGROUND

The present invention relates generally to variable pitch radiator fans, and in particular to a fan blade pitch change assembly for a variable pitch radiator fan.

Variable pitch radiator fans for use in motor vehicles have been proposed. U.S. Pat. No. 6,896,564 teaches a propeller for a boat including a phase adjuster for altering the pitch of the propeller blades. In the '564 patent, an internal combustion engine turns a drive shaft coupled to a propeller shaft. A second shaft is positioned inside of and coaxial with propeller shaft. The second shaft is linked to the propeller blades by a bevel gear. The two shafts are coupled by a planetary gearing system. An actuator shaft is rotated by a servo motor and is coupled to the planetary gear of the second shaft by a worm gear via a moveable orbit gear. When the propeller shaft is rotated by the drive shaft, the second shaft turns in phase with the propeller shaft due to the planetary gearing system. However, if the servo motor is actuated, the actuator shaft rotates to drive the worm gear and moves the orbit gear. The movement of the orbit gear shifts the planetary gear on the second shaft so that the second shaft moves out of phase with the propeller shaft. This differential drives the bevel gear and moves the blades to change their pitch.

U.S. Pat. No. 5,281,094 teaches a variable pitch fan blade mechanism. An internal combustion engine rotates a fan shaft. The fan shaft is connected to a fan hub so that the fan hub rotates with the fan shaft. Fan blades are attached to the fan hub via a gearbox. The gearbox is also attached to a control shaft that is coupled to the fan shaft via the gearbox. An induction motor and an induction brake are mounted so that the squirrel cage rotors are mounted on the control shaft and the stators are mounted on a stationary frame housing the fan unit. To change the blade pitch in one direction, the induction motor is actuated to cause the control shaft to rotate at a different speed than the fan shaft. This differential in rotational speed drives the gearbox to shift the position of the fan blades. To change the blade pitch in the opposite direction, the induction brake is actuated to rotate the control shaft at a different speed than the fan shaft to move the fan blades in the opposite direction.

U.S. Pat. No. 3,967,916 teaches a fan assembly with a plurality of variable pitch blades. A main fan shaft is driven by a motor to turn a blade assembly. The blade assembly includes a plurality of fan blades that are rotatably attached to a frame structure. A pneumatically-driven pitch control rod is positioned coaxially within the main fan shaft and extends out of the main fan shaft inside the frame structure. The pitch control rod includes a series of notches which engage a gear connected to the fan blades. When actuated, the rod moves axially within the main fan shaft to drive the gear to alter the pitch of the fan blades.

While the art teaches various blade pitch mechanisms, the related art fails to teach a blade pitch mechanism that includes two independently operating drivers for controlling the variation in the pitch of the fan blades. Therefore, a need exists in the art for a variable blade pitch mechanism having dual shaft and dual driver control.

SUMMARY

In one aspect, the invention provides a fan blade pitch change mechanism comprising a first drive shaft configured to rotate a fan hub, an actuator shaft coupled to a gear system disposed within the fan hub, the actuator shaft configured to alter a blade pitch of a fan blade attached to the fan hub via the gear system, a first motor attached to the first drive shaft, the first motor configured to rotate the first drive shaft, a second motor attached to the actuator shaft, and the second motor configured to rotate the actuator shaft.

In another aspect, the second motor is coupled to the first drive shaft.

In another aspect, the second motor is coupled to the first drive shaft via the gear system.

In another aspect, the second motor rotates according to the rotation of the first drive shaft.

In another aspect, at least one of the first motor and the second motor comprise an electric motor.

In another aspect, the actuator shaft is disposed within the first drive shaft.

In another aspect, the actuator shaft extends from the second motor, through the first drive shaft, and into the fan hub.

In another aspect, a bearing is disposed between the actuator shaft and the first drive shaft.

In another aspect, the invention provides a fan comprising a hub, a fan blade rotatably attached to the hub via a blade gear, a pitch change gear disposed within the hub and operatively connected to the blade gear, a first motor attached to the hub via a main drive shaft, where the main drive shaft configured to rotate the hub, a second motor attached to the pitch gear via a secondary drive shaft, where the secondary drive shaft configured to change a blade pitch of the fan blade by rotating the pitch change gear.

In another aspect, the secondary drive shaft is disposed within the main drive shaft.

In another aspect, the secondary drive shaft is coupled to the main drive shaft.

In another aspect, the second motor rotates according to the rotation of the main drive shaft.

In another aspect, the pitch change gear comprises a crown gear.

In another aspect, the blade gear comprises a crown gear operatively engaged with the pitch change gear.

In another aspect, the fan is configured to be incorporated into a cooling system.

In another aspect, the cooling system is disposed in a motor vehicle.

In another aspect, the invention provides a cooling system for a motor vehicle comprising a radiator, a variable pitch fan including a hub, a fan blade rotatably attached to the hub via a blade gear, a pitch change gear disposed within the hub and operatively connected to the blade gear, a first driver attached to the hub via a main drive shaft, the main drive shaft configured to rotate the hub, a second driver attached to the pitch gear via a secondary drive shaft, and the secondary drive shaft configured to change a blade pitch of the fan blade by rotating the pitch change gear, and a control system configured to control the operation of the fan.

In another aspect, the control system is configured to send a signal to the first motor to manipulate a rotational speed of the hub.

In another aspect, the control system is configured to send a signal to the second motor to manipulate the pitch of the fan blade.

In another aspect, the first and second drivers are electric motors.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

In the present invention, a pitch change assembly for a variable pitch fan is provided. The pitch change assembly may be used in any device that requires variable cooling, such as electronic components, appliances, or the like. However, in a preferred embodiment, the pitch change assembly of the present invention is provided to a cooling system for a motor vehicle.

Figure 1:
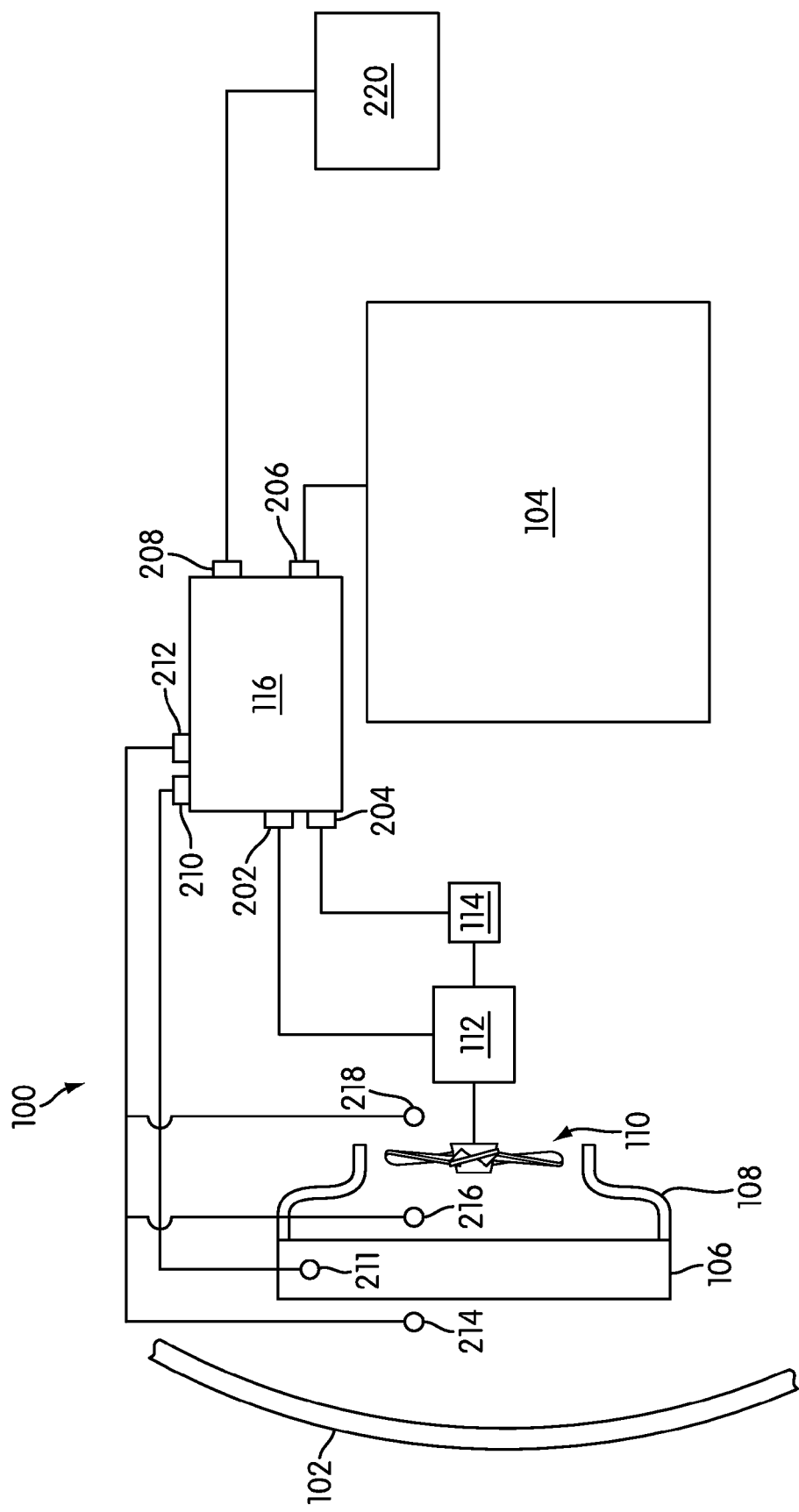
FIG. 1 is a schematic diagram of a preferred embodiment of a portion of a motor vehicle.

FIG. 1 is a schematic diagram of a portion 100 of a motor vehicle. The motor vehicle includes an exterior surface 102 and a power plant 104. Preferably, the motor vehicle includes provisions to cool or ventilate power plant 104. In the embodiment shown in FIG. 1, motor vehicle 100 includes radiator or heat exchanger 106 and fan 110 that can be used to force air across radiator 106. In some embodiments, an optional shroud or duct 108 is provided. Shroud 108 can help to increase the efficiency of fan 110. Fan 110 can be driven in a number of different ways. In some embodiments, fan 110 directly coupled to power plant 104. In these cases, fan 110 is driven by a fan belt, a serpentine belt, or some other accessory drive belt. In other embodiments, fan 110 is drive independently from power plant 104. In these embodiments, fan 110 includes fan drive 112. In a preferred embodiment, fan drive 112 is an electric motor.

Figure 2:
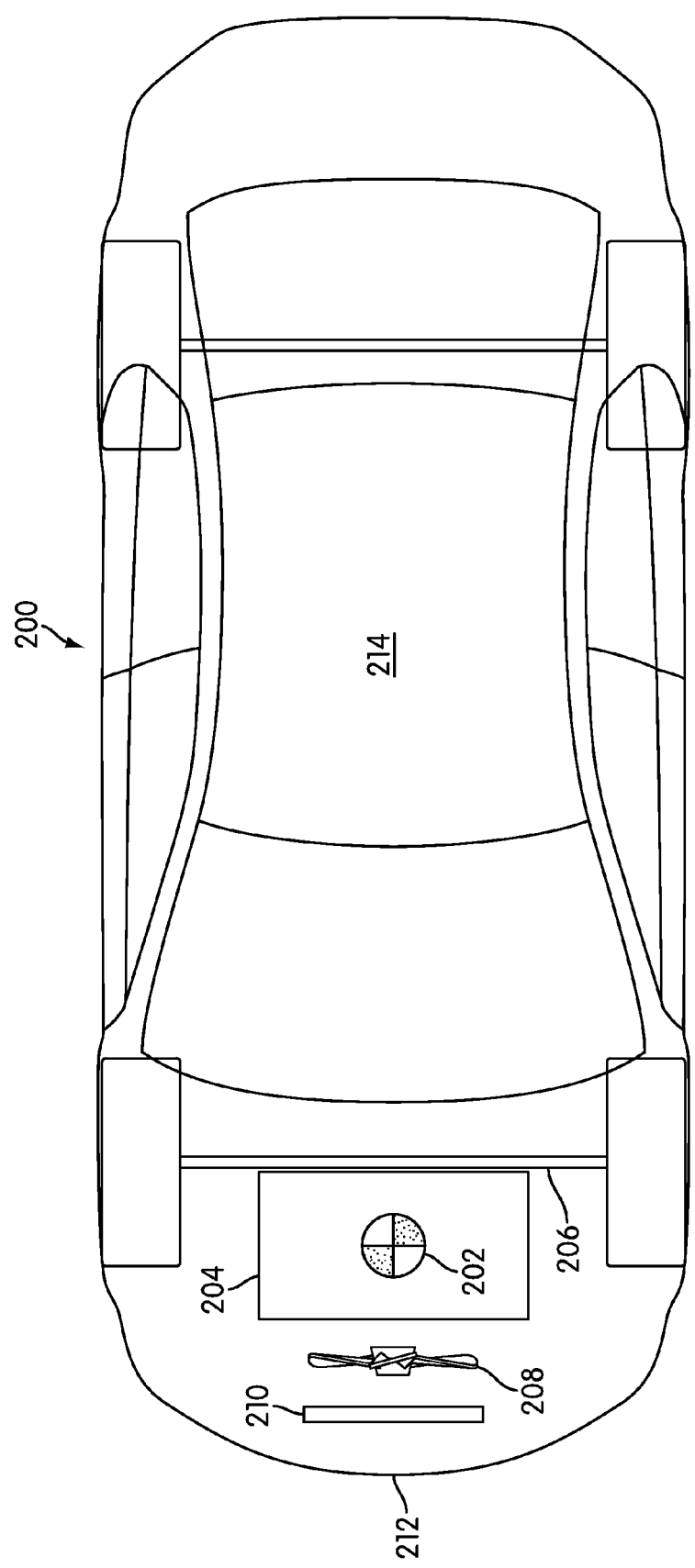
FIG. 2 is a schematic diagram of a top view of a preferred embodiment of a motor vehicle.

Principles and operation of the variable pitch radiator fan can be used in a number of different situations and in any kind of motor vehicle. FIG. 2 is a schematic diagram of a front engine motor vehicle 200. In motor vehicle 200, the center of gravity or center of mass 202 of power plant 204 is disposed forward of front axle 206. Front engine motor vehicles 200 generally have engines 204 located forward of passenger cabin 214. As shown in FIG. 2, fan 208 is disposed between power plant 204 and radiator 210. Exterior surface 212 proximate to radiator 210 can also be observed in FIG. 2. In the embodiment shown in FIG. 2, exterior surface 212 is a front fascia or grille.

Preferably, fan 110 includes at least one fan blade that can assume a number of different pitch positions. Preferably, all of the fan blades are variable pitch, and their range of motion can vary from full normal pitch where air is drawn from radiator 106 towards fan 110, to neutral pitch, to full reverse pitch, where air is pushed from fan 110 towards radiator 106. Preferably, a pitch change mechanism 114 associated with fan 110 helps to change the pitch of the fan blades.

In a preferred embodiment, a control system 116 is provided to manipulate the operation of fan 110. Control system 116 is preferably used to control fan drive 112 and/or pitch change mechanism 114 based on various information collected from one or more sensors. Control system 116 may be provided with any number of ports, sensors, or devices for gathering information related to the cooling system. The term "port" means any interface or shared boundary between two conductors. In some cases, ports can facilitate the insertion and removal of conductors.

Control system 116 preferably includes a number of ports that are used to send information, instructions and/or a signal from control system 116 to various elements. Examples of these types of ports include mechanical connectors and/or electrical connectors. In other cases, ports are interfaces that generally do not provide easy insertion or removal. Examples of these types of ports include soldering or electron traces on circuit boards. In the embodiment shown in FIG. 1, control system 116 includes a fan drive port 202 and a pitch change mechanism port 204. Fan drive port 202 can be used by control system 116 to send a signal to fan drive 112. The signal can include instructions or information that instruct fan drive 112 to operate in a certain way. In some embodiments, control system 116 can send an instruction through fan drive port 202 to fan drive 112 to spin fan 110 at a certain desired speed. Control system 116 preferably also includes pitch change mechanism port 204. Preferably, pitch change mechanism port 204 is used by control system 116 to send a pitch signal to pitch change mechanism 114. The pitch signal is used by pitch change mechanism 114 to establish or set a pitch for the fan blades associated with fan 110.

Control system 116 can also include a number of ports that are used to receive a signal or information from various sensors. Control system 116 can optionally include an engine speed port 206, a vehicle speed port 208, a coolant temperature port 210 in communication with coolant temperature sensor 211, and an air temperature port 212. In one embodiment, control system 116 is the control system provided in co-pending application "Variable Pitch Radiator Fan System" filed on even date herewith as Attorney Docket Number 48-1077. This application is hereby incorporated by reference in its entirety.

Preferably, control system 116 uses one or more signals or items of information received from one or more ports to determine the fan drive speed and the pitch of one or more fan blades.

Figure 3:
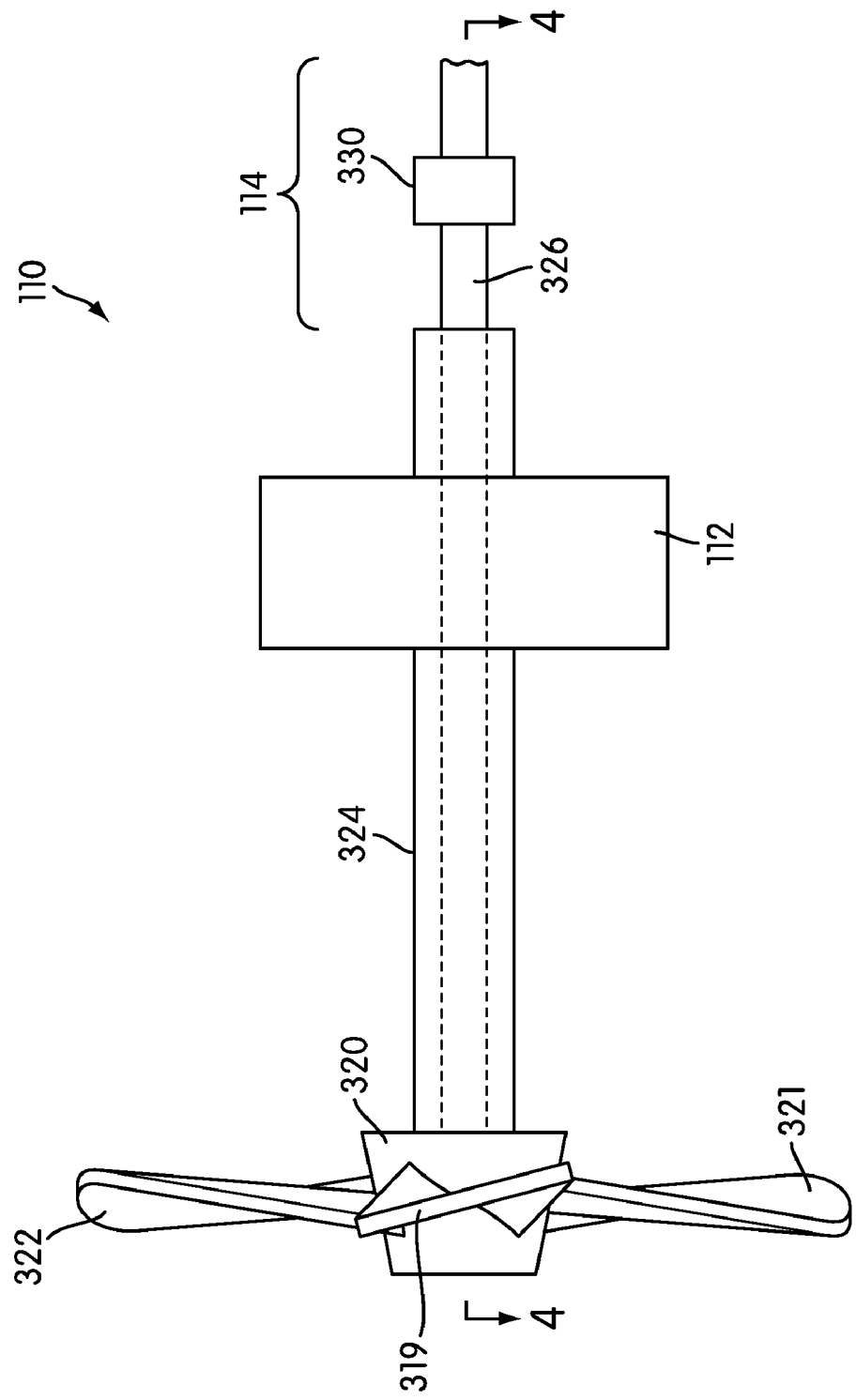
FIG. 3 is a side view of an embodiment of a pitch change assembly.
Figure 4:
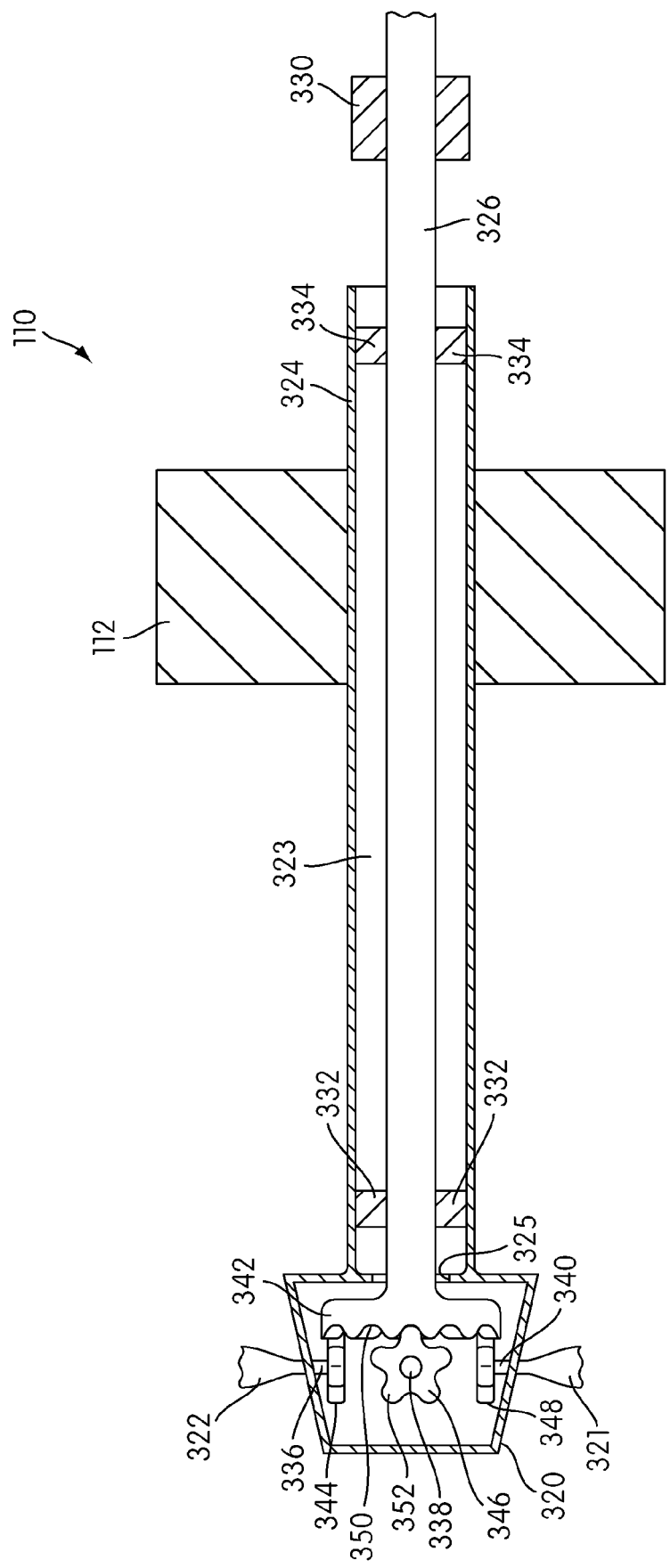
FIG. 4 is a cross-sectional view of the pitch change assembly of FIG. 3 as taken along line 4-4.

FIGS. 3 and 4 show an embodiment of fan 110 including a pitch change mechanism 114. Fan 110 generally includes a fan hub 320 to which several fan blades are rotatably attached. Although any number of fan blades may be provided, only three fan blades are shown in FIG. 3: a first fan blade 319, a second fan blade 321, and a third fan blade 322. Fan blades 319, 321, and 322 may be any type or shape of fan blade known in the art. Fan blades 319, 321, and 322 may be made from any material, such as a metal, a ceramic, or a plastic material.

Fan hub 320 is preferably a hollow shell made of a durable and formable material, such as stainless steel or ceramic. Fan hub 320 is sized and dimensioned to house a gearing system for changing the pitch of fan blades 319, 321, and 322. Fan hub 320 is provided with openings through which fan blades 319, 321, and 322 extend to be operatively connected to the gearing system.

Pitch change assembly 114 generally includes a main drive shaft 324 driven by fan drive 112 and an actuator shaft 326 driven by a second driver 330. In this embodiment, fan drive 112 is a motor, preferably an electric motor. Preferably, second driver 330 is also an electric motor. The operation of both fan drive 112 and second driver 330 is controlled by control system 116 (shown in FIG. 1).

Main drive shaft 324 extends from fan drive 112 to fan hub 320. Main drive shaft 324 is coupled to fan hub 320 so that fan drive 112 can rotate fan hub 320 via main drive shaft 324. Main drive shaft 324 may be coupled to fan hub 320 by any method known in the art, such as with mechanical fasteners, welding, or the like. Preferably, as shown in FIG. 4, main drive shaft 324 is co-formed with fan hub 320 to form a unitary part.

Main drive shaft 324 may have any configuration for a drive shaft known in the art capable of transferring rotational motion from fan drive 112 to fan hub 320. In one embodiment, as shown in FIGS. 3 and 4, main drive shaft 324 is an elongated member. Main drive shaft 324 may have any cross-sectional shape, such as circular, polygonal, or elliptical. Main drive shaft 324 is preferably made from a rigid, durable material, such as metal, ceramic materials, or plastic materials.

In one embodiment, as shown in FIG. 4, main drive shaft 324 is hollow, with an interior space 323 configured to receive actuator shaft 326. This allows for a compact design, as actuator shaft 326 is sized and dimensioned to extend from second driver 330, through main drive shaft 324, and into fan hub 320 through an opening 325. Similar to main drive shaft 324, actuator shaft 326 is preferably made from a rigid material such as metal, ceramic materials, or plastic materials. Actuator shaft 326 is preferably an elongated solid member having any cross-sectional shape.

In order to preserve the position of actuator shaft 326 within hollow interior 323 of main drive shaft 324, first bearings 332 and second bearings 334 are optionally provided. Bearings 332, 334 are positioned within hollow interior 323 and surrounding or substantially surrounding actuator shaft 326. bearings 332, 334 may be any type of bearing known in the art, such as stainless steel ball bearings. First bearings 332 may be positioned at or near opening 325 through which actuator shaft 326 enters fan hub 320. Second bearings 334 may be positioned at or near the point at which actuator shaft 326 exits main drive shaft 324. In other embodiments, the position of bearings 332, 334 may be different, such as anywhere along the length of main drive shaft 324. In other embodiments, additional bearings may be provided, only one set of bearings may be provided, or no bearings may be provided at all.

The gearing system for pitch change assembly 114 preferably includes a main gear 342 engaged with several pitch change gears. FIG. 4 shows three pitch change gears: a first pitch change gear 346 fixedly attached to a base 338 of first blade 319 (not shown for clarity), a second pitch change gear 348 fixedly attached to a base 340 of second blade 321, and a third pitch change gear 344 fixedly attached to a base 336 of third blade 322. Preferably, each blade of fan 110 is attached to a pitch change gear. In other words, one pitch change gear is preferably provided for each blade of fan 110.

Main gear 342 may be any type of gear known in the art, such as a bevel gear or the like. Main gear 342 is preferably made of a durable metal material such as stainless steel, aluminum, or alloys of these materials. In one embodiment, as shown in FIG. 4, main gear 342 is a crown gear configured to engage with each pitch change gear 344, 346, and 348. For example, a tooth 352 on first pitch change gear 346 is shaped and sized to be inserted into a recess 350 on main gear 342.

In operation, main gear 342 alters the pitch of the fan blades by rotating pitch change gears 344, 346, and 348 while fan hub 320 rotates. Fan drive 112 rotates main drive shaft 324. Main drive shaft 324 translates this rotational movement to fan hub 320 causing fan hub 320 to rotate. When fan hub 320 rotates, fan blades 319, 321, 322 are moved along with fan hub 320. In other words, the rotation of main drive shaft 324 causes fan blades 319, 321, and 322 rotate about a center point of fan hub 320. The rotation of main drive shaft 324 preferably does not cause fan blades 319, 321, and 322 to rotate with respect to fan hub 320, i.e., for fan blades 319, 321, and 322 to change pitch. The change of pitch of fan blades 319, 321, and 322 is achieved by rotation of actuator shaft 326, described in greater detail below.

Actuator shaft 326 also turns according to the rotation of main drive shaft 324 because actuator shaft 326 is coupled to main drive shaft 324. Actuator shaft 326 is fixedly attached to main gear 342 which is engaged with pitch change gears 344, 346, and 348. Pitch change gears 344, 346, and 348 are fixedly attached to fan blades 319, 321, and 322. Because fan blades 319 move with fan hub 320 according to the rotation of main drive shaft 324, actuator shaft 326 also rotates according to the rotation of main drive shaft 324. Consequently, second driver 330 rotates according to the rotation of main drive shaft 324 due to the coupling of second driver 330 to actuator shaft 326.

While fan drive 112 and main drive shaft 324 rotate hub, the pitch of fan blades 310, 321, and 322 is controlled by second driver 330. When control system 116 (shown in FIG. 1) determines that a change in the pitch of fan blades 319, 321, and 322 is desired, control system 116 sends a signal to second driver 330 to drive actuator shaft 326. Second driver 330 may turn actuator shaft 326 in the same direction as the rotation of main drive shaft 324 in order to increase the rotation of actuator shaft 326. Alternatively, actuator shaft 326 may turn actuator shaft 326 in an opposing direction to the rotation of main drive shaft 324 to slow the rotation of actuator shaft 326 with respect to main drive shaft 324. Regardless of the direction of spin imparted to actuator shaft 326 by second driver 330, a rotational speed differential is created between the rotational speed of main drive shaft 324 and actuator shaft 326 when second driver 330 is actuated.

The rotation of actuator shaft 326 causes main gear 342 to move with respect to the rotation of fan hub 320. Main gear 342 rotates due to the fixed attachment of actuator shaft 326 to main gear 342. Therefore, main gear 342 is turned in a first direction if the rotational speed of actuator shaft 326 is slowed by second driver 330 and in a second direction if the rotational speed of actuator shaft 326 is increased by second driver 330. Main gear 342 moves at the rate of the rotational speed differential between main drive shaft 324 and actuator shaft 326.

When main gear 342 moves with respect to the rotation of fan hub 320, the engagement of the teeth of pitch change gears 344, 346, and 348 with main gear 342 results in the rotation of pitch change gears 344, 346, and 348. The movement of pitch change gears 344, 346, and 348 rotates fan blades 319, 321, and 322 because of the fixed attachment of fan blades 319, 321, and 322 to pitch change gears 344, 346, and 348. The rotation of fan blades 319, 321, and 322 is with respect to fan hub 320, thereby changing the pitch angle of fan blades 319, 321, and 322. The rotation of fan blades 319, 321, and 322 by pitch change gears 344, 346, and 348 is independent of the turning of fan blades 319, 321, and 322 about main drive shaft 324 on fan hub 320. Therefore, the pitch of fan blades 319, 321, and 322 may be altered without interrupting the operation of fan 110.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A fan blade pitch change mechanism comprising:
   a first drive shaft configured to rotate a fan hub;
   an actuator shaft coupled to a gear system disposed within the fan hub;
   the actuator shaft configured to alter a blade pitch of a fan blade attached to the fan hub via the gear system;
   a first motor attached to the first drive shaft;
   the first motor configured to rotate the first drive shaft;
   a second motor attached to the actuator shaft; and
   the second motor configured to rotate the actuator shaft;
   wherein the actuator shaft is disposed within the first drive shaft and the actuator shaft rotates with the first drive shaft,
   wherein the actuator shaft acts as a drive shaft to rotate the second motor when the actuator shaft rotates with the first drive shaft.

2. The fan assembly according to claim 1, wherein the second motor is coupled to the first drive shaft via the gear system.

3. The fan assembly according to claim 1, wherein the second motor rotates according to the rotation of the first drive shaft.

4. The fan assembly according to claim 1, wherein at least one of the first motor and the second motor comprise an electric motor.

5. The fan assembly according to claim 1, wherein the actuator shaft is disposed within the first drive shaft.

6. The fan assembly according to claim 5, wherein the actuator shaft extends from the second motor, through the first drive shaft, and into the fan hub.

7. The fan assembly according to claim 5, wherein a bearing is disposed between the actuator shaft and the first drive shaft.

8. A fan comprising:
   a hub;
   a fan blade rotatably attached to the hub via a blade gear;
   a pitch change gear disposed within the hub and operatively connected to the blade gear;
   a first motor attached to the hub via a main drive shaft;
   the main drive shaft configured to rotate the hub;
   a second motor attached to the pitch gear via a secondary drive shaft;
   the secondary drive shaft configured to change a blade pitch of the fan blade by rotating the pitch change gear;
   wherein the secondary drive shaft is disposed within the main drive shaft and the secondary drive shaft rotates with the main drive shaft;
   wherein the secondary drive shaft directly drives the second motor when the secondary drive shaft rotates with the main drive shaft.

9. The fan according to claim 8, wherein the secondary drive shaft is disposed within the main drive shaft.

10. The fan according to claim 8, wherein the second motor is configured to rotate the secondary drive shaft.

11. The fan according to claim 8, wherein the second motor rotates according to the rotation of the main drive shaft.

12. The fan according to claim 8, wherein the pitch change gear comprises a crown gear.

13. The fan according to claim 12, wherein the blade gear comprises a crown gear operatively engaged with the pitch change gear.

14. The fan according to claim 8, wherein the fan is configured to be incorporated into a cooling system.

15. The fan according to claim 14, wherein the cooling system is disposed in a motor vehicle.

16. A cooling system for a motor vehicle comprising:
    a radiator;
    a variable pitch fan including a hub,
    a fan blade rotatably attached to the hub via a blade gear,
    a pitch change gear disposed within the hub and operatively connected to the blade gear,
    a first driver attached to the hub via a main drive shaft,
    the main drive shaft configured to rotate the hub,
    a second driver attached to the pitch gear via a secondary drive shaft, and
    the secondary drive shaft configured to change a blade pitch of the fan blade by rotating the pitch change gear;
    wherein the secondary drive shaft is disposed within the main drive shaft and the secondary drive shaft rotates with the main drive shaft;
    wherein the secondary drive shaft rotates the second driver when the secondary drive shaft rotates with the main drive shaft; and
    a control system configured to control the operation of the fan.

17. The cooling system of claim 16, wherein the control system is configured to send a signal to the first motor to manipulate a rotational speed of the hub.

18. The cooling system of claim 16, wherein the control system is configured to send a signal to the second motor to manipulate the pitch of the fan blade.

19. The cooling system of claim 16, wherein the first and second drivers are electric motors.

20. The cooling system of claim 16, wherein the second driver is configured to rotate the secondary drive shaft.

* * * * *